(No Model.)

L. LAFO.
STUMP PULLER.

No. 382,096. Patented May 1, 1888.

Witnesses
A. Ruppert
H. A. Daniels

Inventor
Lemuel Lafo
By Attorney Thomas Simpson
Atty

UNITED STATES PATENT OFFICE.

LEMUEL LAFO, OF PITTSBURG, NEW HAMPSHIRE.

STUMP-PULLER.

SPECIFICATION forming part of Letters Patent No. 382,096, dated May 1, 1888.

Application filed December 27, 1887. Serial No. 259,153. (No model.)

*To all whom it may concern:*

Be it known that I, LEMUEL LAFO, a citizen of the United States, residing at Pittsburg, in the county of Coos and State of New Hampshire, have invented certain new and useful Improvements in Stump-Pullers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make an apparatus by which pine and other stumps may be conveniently uprooted by hand-power.

Figure 1:
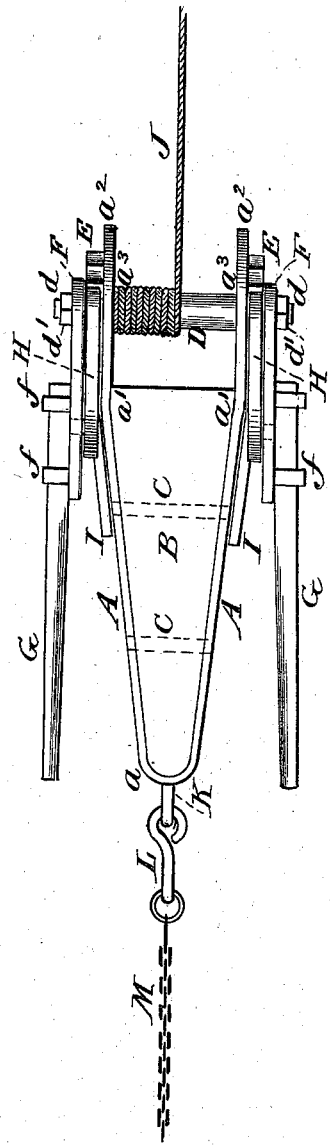
Figure 2:
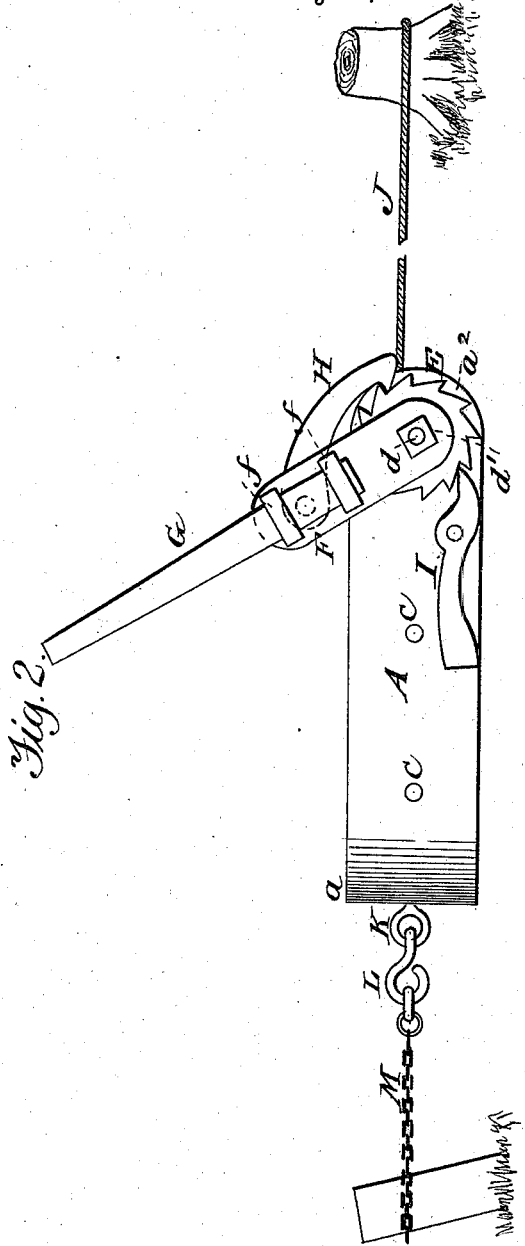

Figure 1 of the drawings is a plan view of my apparatus, and Fig. 2 a side elevation.

In the drawings, A represents a U-shaped frame, made of plate-iron folded on a curve at the middle $a$, and held to a wooden filling, B, by the rivets C C. This filling extends from the fold $a$ to the points $a'$ $a'$, the extensions $a^2$ $a^2$ beyond these points being provided with the opposite bearings, $a^3$ $a^3$, for the windlass D, which has the end-threaded journals $d$ $d$, carrying the nuts $d'$ $d'$. On the outside of the frame and on the windlass D, I make fast the ratchet-wheels E E, while on the journals $d$ $d$, I loosely pivot one end of the levers F F, which are provided with loops $f f$, so that handles G, of greater or less length, may be conveniently applied. On the inside of the levers F are pivoted the drag-pawls H H, while to the outside of the frame A, I pivot the detent-pawls I, which are sufficiently heavy on their rear ends to keep them in contact with the ratchet-wheels. To the windlass is attached one end of a strong rope or chain, J, and to the outside of the frame-fold $a$ is formed an eye, K, which joints with an eye of the hook L, which plays up and down in a vertical plane.

When the machine has been taken out to a stumpy field, I secure the chain M to a stake, stump, or any other object which will hold it, and then fasten the rope to the pine or other stump which is to be uprooted. The chain M being secured to the hook L and the rope over the top of the stump, one man takes hold of each lever-handle G and presses it down, causing the rope to wind slightly on the windlass, where it remains, because the detent-pawls catch a tooth of the ratchet and prevent the windlass from going backward. The workmen now raise the levers, so as to carry forward the drag-pawls to engage another tooth of the ratchet-wheels. Thus the power of two men is greatly multiplied at the expense of velocity, until the strain upon the roots of the tree-stump becomes irresistible, when the roots break and the stump is uprooted. I often pull stumps at a distance of fifty-five feet from the stump-puller. The machine may be swung around stumps, so as to pull a stump from different directions and break the surface roots all around it before the tap-root or more central main ones are made to give way.

The apparatus may be used to haul buildings from one place to another.

I am aware that my windlass, pawls, ratchets, and levers have been used in other stump-pullers, and are very old devices; but

What I claim as new, and desire to protect by Letters Patent, is—

A metallic stump-puller frame formed of two integral arms carrying a windlass near their front ends, together with pawls, ratchets, and levers, and provided on the outside of the fold $a$ with a hook and eye, whereby the stump-puller may be used as described.

In testimony whereof I affix my signature in presence of two witnesses.

LEMUEL LAFO.

Witnesses:
 ALDEN FARNHAM,
 ANDREW J. HEATH.